(12) United States Patent  (10) Patent No.: US 8,777,444 B2
Quinzi et al.  (45) Date of Patent: Jul. 15, 2014

(54) STREETLIGHT HAVING A HOLLOW POLE

(76) Inventors: Gianni Quinzi, San Venanzo (IT); Alfredo Chiacchieroni, San Venanzo (IT)

( * ) Notice: Subject to any disclaimer, the term of this patent is extended or adjusted under 35 U.S.C. 154(b) by 0 days.

(21) Appl. No.: 13/878,241

(22) PCT Filed: Oct. 7, 2011

(86) PCT No.: PCT/EP2011/005010
§ 371 (c)(1),
(2), (4) Date: Jun. 26, 2013

(87) PCT Pub. No.: WO2012/045467
PCT Pub. Date: Apr. 12, 2012

(65) Prior Publication Data
US 2013/0265786 A1    Oct. 10, 2013

(30) Foreign Application Priority Data
Oct. 8, 2010 (EP) ..................................... 10425327

(51) Int. Cl.
*F21S 9/03* (2006.01)
(52) U.S. Cl.
USPC ........................................... 362/183; 362/431

(58) Field of Classification Search
None
See application file for complete search history.

(56) References Cited

U.S. PATENT DOCUMENTS 4,242,726 A * 12/1980 Steadman ..................... 362/418

FOREIGN PATENT DOCUMENTS

GB           2408395 A * 5/2005 ................ F21S 9/03

* cited by examiner

*Primary Examiner* — Donald Raleigh
(74) *Attorney, Agent, or Firm* — John Alumit

(57) ABSTRACT

A streetlight having a hollow pole is provided with a lower hand-access opening closed by a hatch. The hollow pole has an internal surface and an external surface, its external surface being lined by external photovoltaic cells in an upper section thereof, and a lamp that is positioned inside the hollow pole. The upper end of the hollow pole is open and the lamp is mounted on positioning means so that the lamp can be moved, inside the hollow pole, from the lower hand-access opening until near the upper end of the hollow pole on which a tiltable screen is mounted having a side facing upward and a side facing downward, the latter being lined by a reflecting panel, the internal surface of the hollow pole being covered by internal photovoltaic cells.

6 Claims, 3 Drawing Sheets

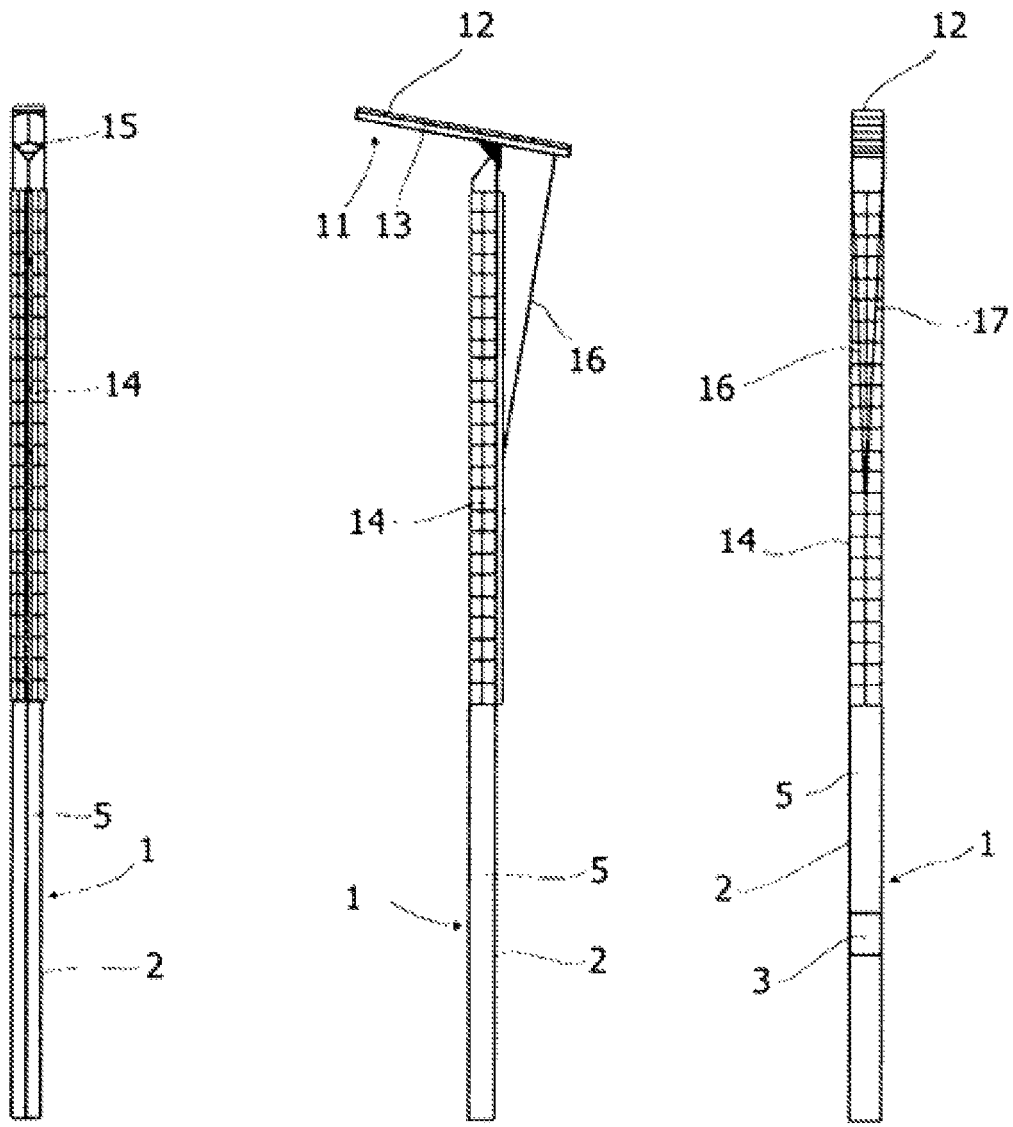

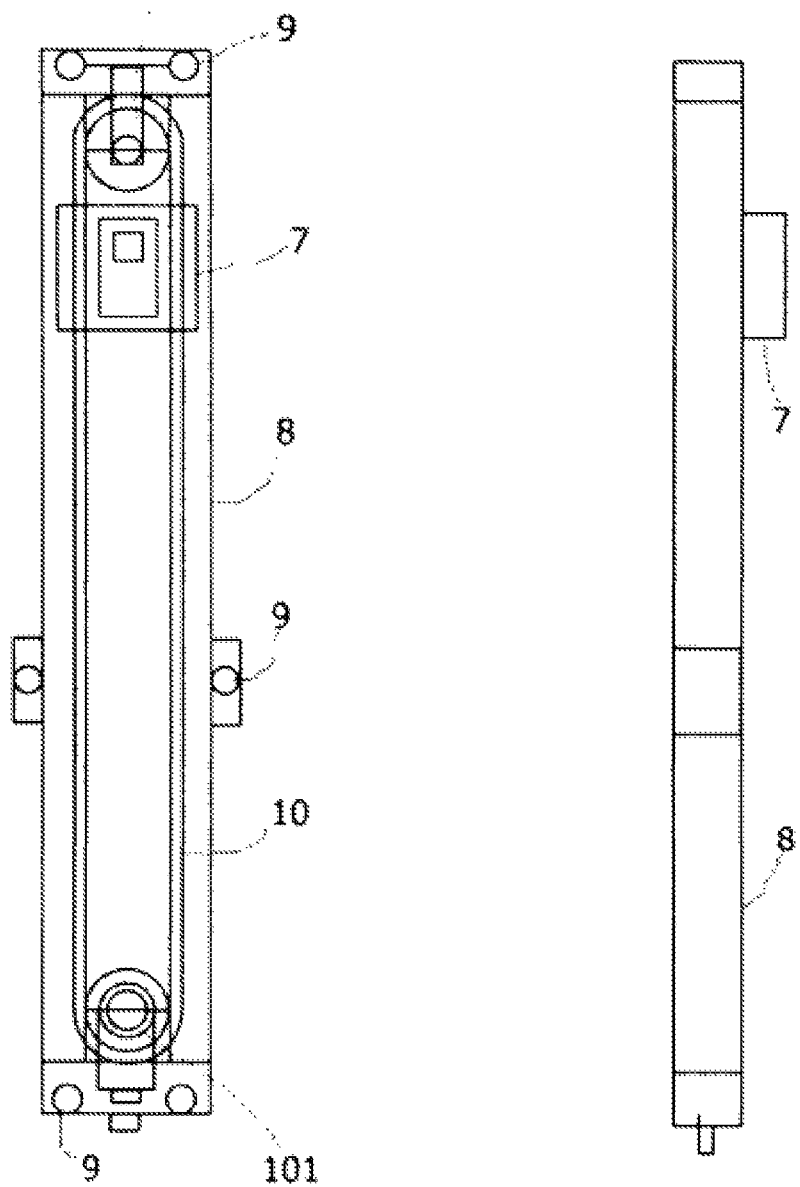

STREETLIGHT HAVING A HOLLOW POLE

CROSS-REFERENCE TO RELATED APPLICATION

This application claims the benefit of the priority filing date in PCT/EP2011/005010 and referenced in WIPO Publication No. WO/2012/045467. The earliest priority date claimed is Oct. 8, 2010.

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The present invention relates to a streetlight having a hollow pole.

Known is patent invention FR 2908861 which discloses an internally hollow pole for the passage of feeding wires and having light external zones, particularly at the height of a person, then alternating to passive zones that are partially covered with photovoltaic panels.

Furthermore, international patent application no. WO 20081125711 discloses a streetlight on a pole, of which photovoltaic panels are arranged. In this way, a cantilever effect due to wind is avoided, an effect that would occur if normal photovoltaic panels were used.

Patent application OS 2 408 395 discloses a streetlight pole having a hatch for putting electric components and batteries inside. The pole is lined in an upper section thereof by photovoltaic panels picking up the sun's energy and transforming it into electric energy.

None of the above-cited documents discloses a streetlight so made that it comprises means adapted to recover energy from the emission of artificial lamp light inside its pole.

An object of the present invention is to optimize a street lighting system with minimal environmental impact.

Another object of the invention is to manufacture an energy-saving streetlight, in particular by using energy obtained by transforming the same artificial light energy of the streetlight lamp.

Yet another object of the invention is to manufacture an easily made street light. Furthermore, an object of the invention is to manufacture a streetlight with an easy-to-replace lamp.

SUMMARY

The invention is an energy-saving streetlight having a hollow pole provided with a lower hand-access opening closed by a hatch, the hollow pole having an internal surface and an external surface. Its external surface being lined by external photovoltaic cells in an upper section thereof, and a lamp that is positioned inside the hollow pole. The upper end of the hollow pole is open and the lamp is mounted on a positioning means so that the lamp can be moved inside the hollow pole, from the lower hand-access opening to the area near the upper end of the hollow pole. There, a tiltable screen is mounted having a side facing upward and a side facing downward. The latter is lined by a reflecting panel. The internal surface of the hollow pole is covered by internal photovoltaic cells.

DRAWINGS

FIGS. 1 to 3 are diagrammatic front, side and rear views, respectively, of a street light according to the present invention;

FIGS. 5 and 6 are diagrammatic front and side views of the lamp positioning means.

DESCRIPTION

Figure 4:
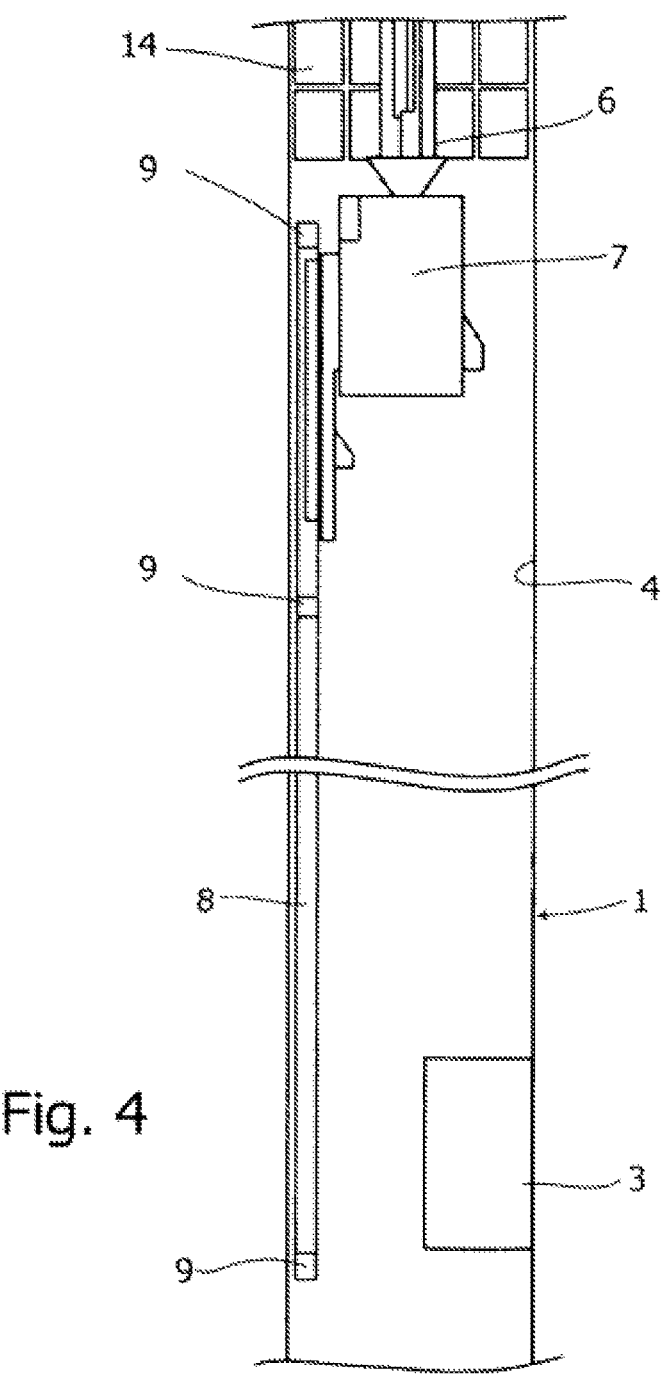
FIG. 4 is an enlarged diagrammatic fragmentary longitudinal cross section of the streetlight pole in FIGS. 1 to 3 inside of which are lamp positioning means, in a side view.

First, referring to FIGS. 1 to 3, a street light is shown according to the invention in a front, side and rear view, respectively. The streetlight is generally comprised of a hollow pole 1, having a triangular cross section. The pole can be of any other cross section shape. In the figures, a lower section 2 of the hollow pole 1 is shown, in which a hand access lower opening closed by a hatch 3 is formed.

The hollow pole 1 has an internal surface 4 and an external surface 5. The internal surface 4 is shown in FIG. 4, which shows a diagrammatic fragmentary longitudinal cross section of a streetlight pole according to the invention.

Inside the hollow pole 1, there are positioning means for a lamp 6 maintained by a lamp holder 7. The lamp holder 7 can slide on a rail 8 that is fixed to the hollow pole 1 by means of fastening points generally indicated as 9. The rail 8 is shown in more detail in FIGS. 5 and 6 depicting front and side views of the lamp positioning means. These lamp-positioning means comprise, as associated to the rail 8 for the lamp holder sliding, a flexible connecting member, such as a chain 10 or a belt sliding on the rail.

The chain 10 is mounted on a pair of lower and upper wheels or rollers 101, 102. In this way, the lamp 6 positioned in the lamp holder 7, which is arranged on the chain 10 in the hand access opening inside the hollow pole, can be moved to the area near the upper end of the hollow pole 1. Movement of the chain 10 can be performed manually by means of a crank connected to the wheel 101. Alternatively, the wheel 101 can be driven by a motor fed by a battery (not shown).

Turning to FIGS. 1 to 3, in particular to FIG. 2, on the upper end of the hollow pole 1 that is open, a tiltable screen 11 is mounted having a side facing upward, which is covered by photovoltaic cells 12, and an opposite side, i.e. facing downward, lined by a reflecting panel 13.

As shown in FIG. 4, the internal surface of the hollow pole 1, facing the lamp 6, is covered by internal photovoltaic cells 14.

On the upper end of the hollow pole 1, under the screen 11, lenses 15 (FIG. 1) are provided that focus the light as desired for magnifying and reducing the light beam.

The tiltable screen 11 is hinged on the upper end of the pole and its inclination is adjustable from the bottom by tie rods 16, 17. Further external photovoltaic cells 14, that are able to pick up solar energy and transform it into electric energy, are provided from a determined height on the external surface of the hollow pole 1.

Even if not shown, the street light pole is internally provided with a system having an inverter to put solar energy and energy provided by the lamp in the mains through external and internal photovoltaic cells.

To operate, after being inserted inside the hollow pole 1 and fastened to the chain 10 through the lamp holder 7 the lamp 6 is moved to the area near the upper end of the hollow pole 1 by moving the chain 10 by means of the crank or the motor. At the upper end of the hollow pole 1, the lamp 6 lights the screen 11 through the upper opening of the hollow pole 1. The lamp's 6 rays are reflected by the reflecting panel 13 on the lower side of the screen 11. The lenses 15 serve to magnify or reduce the light beam. At the same time, the lamp 6 lights the internal photovoltaic cells 14 that feed the mains through the inverter by transforming the artificial light of the lamp 6. When the lamp is switched off, the external photovoltaic cells 14 and the screen's 11 photovoltaic cells 12 are hit by the sun's rays and feed the mains through the inverter by transforming solar energy.

What are claimed:

1. A street light having a hollow pole provided with a lower hand-access opening closed by a hatch (3), the hollow pole (1) having an internal surface and an external surface, the hollow pole's external surface being lined by external photovoltaic cells (14) in an upper section thereof, and a lamp (6) that is positioned inside the hollow pole (1), wherein the upper end of the hollow pole (1) is open and the lamp (6) is mounted on positioning means so that the lamp can be moved, inside the hollow pole (1), from the lower hand-access opening until near the upper end of the hollow pole (1) on which a tiltable screen (11) is mounted having a side facing upward and a side facing downward, the latter being lined by a reflecting panel (13), the internal surface of the hollow pole (I) being covered by internal photovoltaic cells (14).

2. The streetlight according to claim 1, wherein the means for positioning the lamp (6) comprises an endless flexible connecting member (10) riding on transmission elements, a lamp holder (7) with a lamp (6) being fixed to the flexible connecting member (10).

3. The streetlight according to claim 2, wherein guiding means cooperates with the lamp positioning means in order to guide the lamp from the lower hand-access opening until near the upper end of the hollow pole (1).

4. The street light according to claim 1, wherein a tiltable screen(11) is provided on its side facing downward with at least a lens (15) for magnifying and reducing a light beam.

5. The streetlight according to claim 1, wherein the tiltable screen (11) is hinged to an upper end of the hollow pole (1) and inclination of the tiltable screen can be adjusted by tie rods (16), the tiltable screen (11) being lined on its upper side by photovoltaic cells (12) and on its lower side by a reflecting panel.

6. The streetlight according to claim 1, wherein the hollow pole (1) is further internally provided with a system having an inverter to put on energy given by the sun and the lamp in the mains (6) through the external and internal photovoltaic cells (14).

* * * * *